(12) United States Patent
Kanematsu et al.

(10) Patent No.: US 8,825,400 B2
(45) Date of Patent: Sep. 2, 2014

(54) DATA PROCESSING APPARATUS

(75) Inventors: Osamu Kanematsu, Nagoya (JP); Takeshi Shikimachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 717 days.

(21) Appl. No.: 12/588,565

(22) Filed: Oct. 20, 2009

(65) Prior Publication Data
US 2010/0114975 A1 May 6, 2010

(30) Foreign Application Priority Data
Oct. 30, 2008 (JP) .................................. 2008-279821

(51) Int. Cl.
*G06F 17/30* (2006.01)
*G06F 7/00* (2006.01)

(52) U.S. Cl.
CPC .... *G06F 17/30241* (2013.01); *G06F 17/30917* (2013.01)
USPC ............ 701/532; 701/409; 701/450; 701/451

(58) Field of Classification Search
CPC ............ G06F 12/0804; G06F 12/0808; G06F 12/0806; G06F 17/30; G06F 17/30002; G06F 17/30241; G06F 17/30917
USPC .................. 701/409, 208, 450, 451, 532, 411
See application file for complete search history.

(56) References Cited

U.S. PATENT DOCUMENTS

| | | | | |
|---|---|---|---|---|
| 5,933,100 A * | 8/1999 | Golding | .................... | 340/995.13 |
| 6,154,152 A | 11/2000 | Ito | | |
| 6,381,536 B1 * | 4/2002 | Satoh et al. | .................... | 701/431 |
| 7,634,452 B2 * | 12/2009 | Adachi et al. | .................... | 706/46 |
| 7,680,589 B2 * | 3/2010 | Yamada | ........................ | 701/415 |
| 7,769,541 B2 * | 8/2010 | Watanabe | ..................... | 701/450 |
| 7,877,203 B2 * | 1/2011 | Mikuriya et al. | ............. | 701/450 |
| 7,890,251 B2 * | 2/2011 | Nakae et al. | .................. | 701/416 |
| 8,284,995 B2 * | 10/2012 | Diaz et al. | ..................... | 382/104 |

(Continued)

FOREIGN PATENT DOCUMENTS

| | | |
|---|---|---|
| JP | A-H06-088733 | 3/1994 |
| JP | A-2000-311175 | 11/2000 |

(Continued)

OTHER PUBLICATIONS

Office Action mailed on Dec. 14, 2010 issued from the Japan Patent Office in the corresponding Japanese patent application No. 2008-279821 (and English translation).

(Continued)

*Primary Examiner* — Thomas Black
*Assistant Examiner* — Sara Nelson
(74) *Attorney, Agent, or Firm* — Posz Law Group, PLC

(57) ABSTRACT

When a navigation apparatus generates, in the course of learning a new road, shape points information of the new road as well as new road information and connecting road information which respectively specify a road name, road attributes and other features of the new road and connecting roads, the generated information regarding the new road is examined if a corresponding road that corresponds to the new road is registered in case that a map database used by the navigation apparatus is updated. If the corresponding road is found in the updated map database, the generated information of the new road such as the shape points information is deleted, thereby securely invalidating the generated information that became unnecessary due to the update of the map database.

14 Claims, 6 Drawing Sheets

(56) References Cited

U.S. PATENT DOCUMENTS

| | | |
|---|---|---|
| 2002/0004701 A1* | 1/2002 | Nakano .................. 701/200 |
| 2003/0004636 A1* | 1/2003 | Adachi .................. 701/201 |
| 2006/0217879 A1* | 9/2006 | Ikeuchi et al. ............. 701/208 |
| 2007/0213929 A1* | 9/2007 | Tanizaki et al. ............ 701/208 |
| 2008/0120171 A1* | 5/2008 | Ikeuchi et al. ............. 705/13 |
| 2008/0162041 A1* | 7/2008 | Nakamura ............... 701/209 |
| 2009/0171976 A1* | 7/2009 | Obara et al. .............. 707/10 |
| 2010/0014712 A1* | 1/2010 | Sampedro Diaz et al. ... 382/104 |
| 2010/0063727 A1* | 3/2010 | Umezu et al. ............. 701/208 |
| 2010/0114975 A1* | 5/2010 | Kanematsu et al. ......... 707/802 |
| 2010/0121886 A1* | 5/2010 | Koshiba et al. ............ 707/803 |

FOREIGN PATENT DOCUMENTS

| | | |
|---|---|---|
| JP | A-2007-047271 | 2/2007 |
| JP | A-2007-078481 | 3/2007 |
| JP | A-2007-163936 | 6/2007 |
| JP | A-2009-014733 | 1/2009 |
| WO | WO 2008126431 A1 * | 10/2008 |

OTHER PUBLICATIONS

Extended European Search Report issued on Apr. 26, 2011 in a corresponding European Application No. 09012875.2.

Examination Report dated Apr. 11, 2012 issued from the European Patent Office in the corresponding European patent application No. 09 012 875.2-236.

Examination Report dated Nov. 7, 2012 in corresponding EP Application No. 09 012 875.2.

* cited by examiner

| ROAD ID | COORD INFO | ADDITIONAL INFO ||
| | | CONNECTING ROADS | NEW ROAD |
|---|---|---|---|
| A | A1(xa1, ya1)<br>A2(xa2, ya2)<br>A3(xa3, ya3) | NATIONAL ROAD 33<br>PREF ROAD 66 | ONE LANE<br>IN TRAFFIC |
| B | B1(xb1, yb1)<br>B2(xb2, yb2)<br>B3(xb3, yb3) | ONE WAY<br>TWO LANES<br>IN TRAFFIC | — |
| C | C1(xc1, yc1)<br>C2(xc2, yc2) | — | EXPRESS WAY 7 |

| ROAD ID | COORD INFO | ADDITIONAL INFO | |
|---|---|---|---|
| | | CONNECTING ROADS | SECTION DATA |
| D | D1(xd1, yd1)<br>D2(xd2, yd2)<br>D3(xd3, yd3) | NATIONAL ROAD 33<br>PREF ROAD 66 | ONE WAY |
| E | S(xs, ys)<br>E(xe, ye) | ONE LANE<br>  IN TRAFFIC<br>TWO LANES<br>  IN TRAFFIC | — |
| F | M(xm, ym) | — | EXPRESS WAY 7 |

DATA PROCESSING APPARATUS

CROSS REFERENCE TO RELATED APPLICATION

The present application is based on and claims the benefit of priority of Japanese Patent Application No. 2008-279821, filed on Oct. 30, 2008, the disclosure of which is incorporated herein by reference.

FIELD OF THE INVENTION

The present invention generally relates to a data processing apparatus which processes map data.

BACKGROUND INFORMATION

A Japanese patent document JP-A-H06-88733 discloses a navigation apparatus that learns a new road not registered in a map database based on the travel locus of the subject vehicle. As disclosed in the above document, the navigation apparatus generates and stores route data based on the travel locus of the vehicle when the vehicle has traveled an area outside of the registered area in the map database, for the purpose of "learning" the new road. Therefore, when a new road not registered in the map database is constructed, the new road is learned by the travel of the subject vehicle.

The map database used in the navigation apparatus of the above document is updated, the "learned" road that does not exist in the database before the update may be present (i.e., registered) in the database after the update. In that case, the data used for identifying the "learned" road becomes useless, thereby requiring a process that invalidates the useless data, for example. The navigation apparatus of the above-described type typically uses, as road identification data of the learned road, shape points coordinate data of the learned road, a link ID of the connecting road that is connected to the learned road, or the like. Therefore, the navigation apparatus may use those data, that is, the coordinate data and/or the link ID of the connecting road, to search for the road that corresponds to the learned road, and the data of the learned road may be invalidated when a corresponding road of the learned road is found in the updated database.

However, the link ID of the pre-update database may be different from the link ID of the post-update database for the same registered road, thereby making it impossible or impractical for searching a road in the post-update database based on the link ID of the pre-update database. Further, the shape point coordinates that approximates a two dimensional road having a width by a one dimensional line may not practically be used for the road search in the post-update database. That is, the coordinates may not match in the pre-update database and in the post-update database. Even if a nearby road that exists in the vicinity of a point indicated by the shape point coordinates is assumed as the learned road, that may not identify the corresponding road in an accurate manner, especially when there are more than one road in that vicinity.

SUMMARY OF THE INVENTION

In view of the above and other problems, the present disclosure provides a data processing apparatus that securely invalidate unnecessary data in an updated map database based on an advantageous data processing scheme.

In an aspect of the present disclosure, the data processing apparatus includes: a database access unit for enabling access to a map database that registers information of the road; and a section information generation unit for generating not-yet-registered road section information identifying a road section that is not yet registered in the map database, the not-yet-registered road section information includes (a) coordinate information that represents road shape coordinates of a not-yet-registered road section and (b) additional information that represents, without using a map database specific ID used in the map database accessible by the database access unit, (b-1) the not-yet-registered road section or (b-2) a nearby terrestrial object in a vicinity of the not-yet-registered road section.

The map database may be, in this case, accumulation of map data such as road data, facility data, geographical data and the like, for identifying and specifying a road section, not necessarily accompanied by a data management function for managing the map data. Further, the access unit may access to a map database in an external storage facility that exists outside of the vehicle or the like, or may access to a map database stored in an external server through a wireless communication and public network.

Further, the map database specific ID used in the map database accessible by the database access unit is identification information for identifying a registered terrestrial object specific to each version of the map database, or to a production company of the map database or the like, for example. More practically, the map database specific ID may be link IDs for identifying road sections registered in the map database, or facility IDs for identifying facility buildings or the like registered in the map database.

The not-yet-registered road section may be, for example, a learned road section learned by the data processing apparatus, that is, the "learned" road, and the section information generation unit may generate the not-yet-registered road section information based on a travel locus of the subject apparatus that has traveled the not-yet-registered road section, for example. Further, the information that represents the not-yet-registered road section may be, for example, a road name of a road that corresponds to a whole or a part of the relevant not-yet-registered road section. The additional information representing the not-yet-registered section may further be a road type of the relevant road section, or a road attribute of the relevant road section. The additional information representing the nearby terrestrial object may be, for example, information on a connecting road that is connected to the relevant road section, or a nearby facility standing on the relevant road section.

Further, the data processing apparatus further includes: a road section identification unit for identifying a road section that has been identified by the not-yet-registered road section information generated by the section information generation unit from among road sections registered in the map database through an access to the map database by the database access unit, when the map database accessed by the database access unit has been updated; and an invalidation unit for invalidating, from among the road sections registered in the updated map database, the not-yet-registered road section information corresponding to the not-yet-registered road section identified by the road section identification unit. The road section identification unit pre-identifies, based on the coordinate information in the not-yet-registered road section information, the road section in a vicinity of the road section that is identified by the coordinate information from among the road sections registered in the updated map database, and, a pre-identified vicinity road section is further examined in terms of matching to the additional information in the not-yet-registered road section information.

As described above, the data processing apparatus of the present disclosure uses the coordinate information and the additional information as information for pre-identifying/ identifying the not-yet-registered road section, and does not use the database specific ID such as a link ID or the like that is specific to a certain map database of map data. Therefore, regardless of the link ID used in the database which is being accessed, that is, regardless of the version, and/or the production company of the map database, a corresponding road section that corresponds to the not-yet-registered road section can be identified from among the registered road sections in the post-update map database. In other words, the corresponding road section is securely identified in the updated map database, irrespective of the link ID, the version, and/or the production company of the database, thereby allowing invalidation of the useless data in the not-yet-registered road section information.

In another aspect of the present disclosure, the above invalidation scheme may be applied to the navigation apparatus capable of handling a standardized traffic information service, such as VICS (Vehicle Information and Communication Service, implemented in Japan). More practically, when traffic information such as congestion information or the like is provided from a VICS information center through radio beacons or light beacon, the VICS capable navigation apparatus displays the congestion information on a display unit for notifying the user about the congestion. The congested road section is identified by the link ID used in the map database of the information center. Therefore, the navigation apparatus uses a conversion table for converting VICS information link ID to the map database link ID used in the subject vehicle, for identifying and displaying the congested road section. Thus, if the map database is updated without the update of the conversion table, the congested road section may not be identified by the navigation apparatus.

In view of the above situation, the data processing apparatus includes: a database access unit for enabling access to a map database that registers information of the road; a road section information acquisition unit for acquiring registered road section information, the registered road section information representative of information of a road section registered in the map database that is accessible by the database access unit, the registered road section information that represents, without using map database specific IDs used in the map database accessible by the database access unit, (a) coordinate information representing coordinates of a point on the road section in the map database or coordinates of a point around the road section in the map database, and (b) additional information including (b-1) information of the road section or (b-2) information of a nearby terrestrial object of the road section; and a road section identification unit for determining the road section indicated by the registered road section information (a) by pre-identifying, from among the registered road sections in the map database, the road section having, on itself or around itself, the point represented by the coordinates in the coordinate information based on the coordinate information in the registered road section information acquired by the road section information acquisition unit by having access to the map database through the database access unit, and (b) by identifying, from among the pre-identified road sections, the road section indicated by the additional information in the registered road section information.

The data processing apparatus of the present disclosure thus is enabled to identify the road section indicated by the registered road section information by utilizing, instead of the link ID or the like, the coordinate information and the additional information of the road section acquired from the external resource, regardless of the update of the database and/or the conversion table.

Further, the coordinate information in the registered road section information may be the information of coordinates of shape points on the road section indicated by the registered road section information.

That is, the data processing apparatus includes: the database access unit; the road section information acquisition unit; and the road section identification unit respectively functioning in the same manner as the above, with the difference of data contents, that is, the registered road section information used for road section identification is shape point coordinate information representing coordinates of shape points on the road section, in association with the additional information described above.

The shape point coordinates acquired by the acquisition unit and used for road section identification by the identification unit enable the accurate identification of the road section indicated by the registered road section information, from among the road sections registered in the map database.

Furthermore, the additional information in the road section information may be one of the following types. That is, the additional information may be (a) a name for identifying connecting roads connected to the road section identified by the road section information, or (b) a name representative of connecting roads connected to the road section identified by the road section information. The name of the connecting roads in the additional information may be replaced with an attribute of the connecting roads.

Furthermore, the additional information may be (a) a name for identifying a road that includes the road section identified by the road section information, or (b) a name representative of a road that includes the road section identified by the road section information. The name of the road in the additional information may be replaced with an attribute of the connecting roads.

By utilizing those types of additional information, the accuracy of the road section identification is further secured.

BRIEF DESCRIPTION OF THE DRAWINGS

Other objects, features and advantages of the present invention will become more apparent from the following detailed description made with reference to the accompanying drawings, in which.

DETAILED DESCRIPTION

Hereinafter, the embodiment of the present invention is described with reference to the drawings. However, the described embodiment is not limiting the scope of the invention, and various modifications are possible.

(Configuration)

Figure 1:
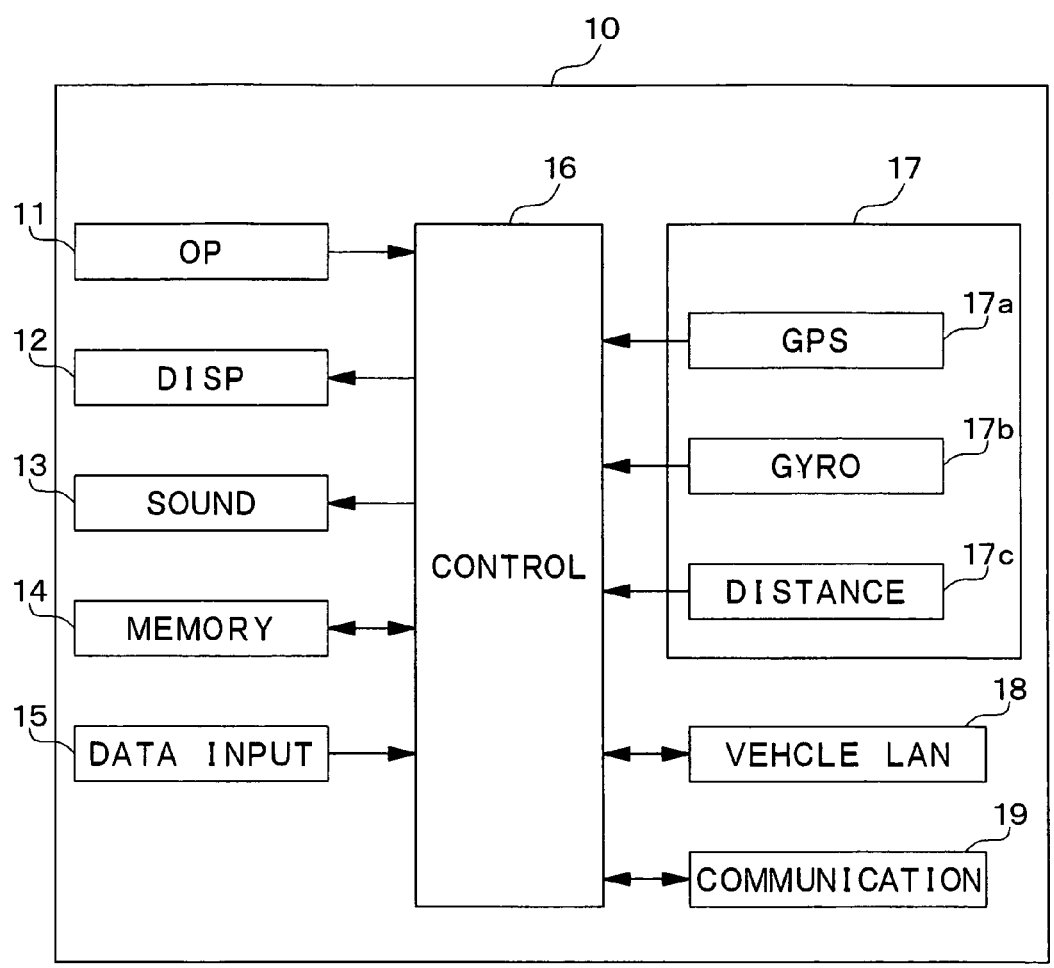
FIG. 1 is a block diagram showing configuration of a navigation apparatus in an embodiment of the present disclosure.

FIG. 1 is a block diagram which shows the configuration of a navigation apparatus 10 in the present embodiment. The navigation apparatus 10 is composed of an operation unit 11, a display unit 12, a sound output unit 13, a memory unit 14, a data input unit 15, a control unit 16, a position sensor 17, a vehicle LAN communication unit 18 and an external communication unit 19.

The operation unit 11 is a part which takes an instruction of all kinds from the user, and is, more specifically, composed of mechanical key switches, touch switches and the like.

The display unit 12 is a displaying part, and is, more specifically, composed of an LCD display, an organic EL display, or the like.

The sound output unit 13 is a part which outputs sound based on the signals from the control unit 16.

The memory unit 14 stores various information by utilizing a device such as a hard disk drive (HDD) or the like that does not require memory retention operation.

The data input unit 15 is a part that enters data of all kinds such as the road data, the facility data and the topographic data which compose a map database by having access to storage media that stores the map database. The data is used to provide a route guidance or the like for the user. The storage media is capable of storing a large volume of data such as a DVD-ROM, an HDD or the like, due to the amount of data required for the guidance function or the like.

The control unit 16 is composed mainly by a well-known microcomputer which consists of a CPU, a ROM, a RAM, an I/O and a bus that interconnects those components and other parts. The control unit 16 controls various components of the navigation apparatus 10 according to the program which is memorized in the ROM and/or the program which is loaded in the RAM.

The position sensor 17 includes a GPS receiver 17a for receiving signals from GPS satellites through a GPS antenna (not shown), a gyroscope 17b for detecting rotational motion of the vehicle, and a distance sensor 17c for detecting a travel distance of the vehicle based on acceleration of the longitudinal direction of the vehicle and the like. The components 17a to 17c are configured to operate in a mutually compensating manner for correcting errors of respectively different natures.

The vehicle LAN communication unit 18 is a part which sends and receives various information through the vehicle LAN (not shown in the drawing).

The external communication unit 19 is a part that receives traffic information such as accident information and traffic congestion information from an information center (e.g., VICS information center) through the light beacon and/or the electric wave beacon installed on the roadside. The communication unit 19 may also receive the traffic information through the FM multiplexed broadcast.

(Operation of the Navigation Apparatus)

The operation of the navigation apparatus 10 is described in the following.

(1) Road Acquisition Process

Figure 2:
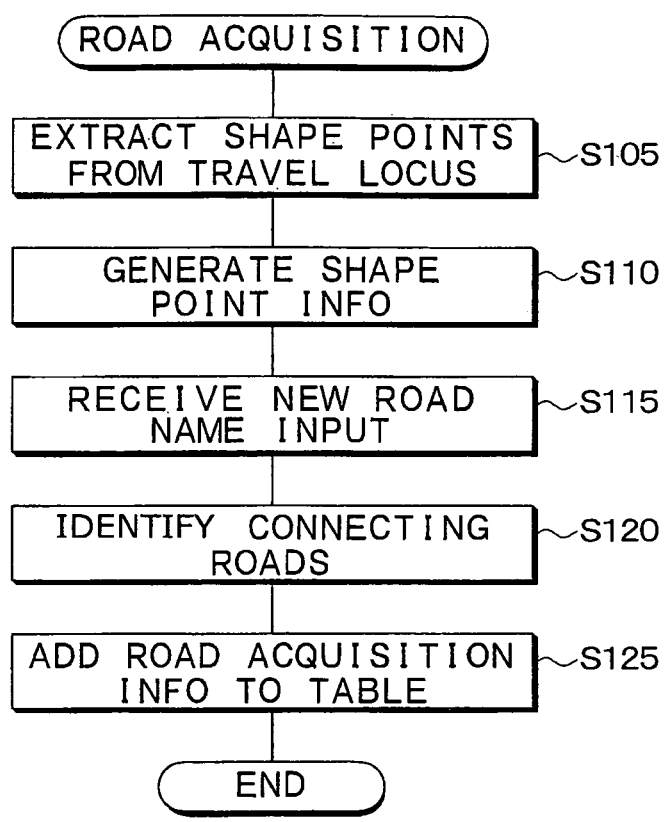
FIG. 2 is a flowchart of a road acquisition process in the embodiment.

The navigation apparatus 10 acquires, or "learns," a new road that is not registered in the map database and is not yet traveled when accessing the map database through the data input unit 15. The new road is identified as a section or a road, or a road section, or road sections. As shown in FIG. 2, the new road is acquired by a road acquisition process of steps S105 to S125. The control unit 16 of the navigation apparatus 10 detects a travel locus of the self vehicle by specifying the present location of the self vehicle by using the position sensor 17 at the regular intervals while the self vehicle is traveling. Then, based on the travel locus of the self vehicle on the new road, the new road is learned. The road acquisition process is started at a timing when the self vehicle starts traveling a database registered road or on a previously-learned road after the start of traveling the new road.

In S105, the control unit 16 of the navigation apparatus 10 extracts shape point coordinates of the road based on the travel locus of the self vehicle on the new road by using a method that is well-known. Then, the control unit 16 generates shape point coordinates information which represents extracted shape point coordinates in S110.

Then, in S115, the control unit 16 receives the input of the name of the new road and the attribute of the new road, together with other information, from the user through the operation unit 11. For example, the name of the new road may look like "National Road 66," "Expressway I-77," "Byway 88" and the like. The attribute of the new road may include (a) road classification for the distinction between an expressway, a local road, or the like, (b) road width, (c) traffic direction such as one-way, bi-directional, two lanes on one side of traffic, or the like besides other characteristics. The name and attribute of the new road is used to generate new road information. In this case, user input regarding the name/attribute may be omitted in step S115, and the new road information is filled with void data.

Then, in S120, the control unit 16 accesses the map database through the data input unit 15, and identifies the name and the attribute of a road section connected to the new road (designated as a "connecting road" hereinafter). The name and attribute of the connecting road are same as those of the new road described above. Then, the control unit 16 generates connection road information which represents the name and the like of the identified connecting road. In this case, if the connecting road in the map database does not have the name and attribute registered in the map database due to the road rank categorized as a minor road or the like, the name and attribute of the connecting road information generated by the control unit 16 are filled with void data.

Then, in S125, the control unit 16 adds road acquisition information to a data table stored in the memory unit 14. The data table is designated as new road table hereinafter, and the detail of the data table is described later. The road acquisition information is the information for specifying the new road that is to be learned by the database. More practically, the new road to be learned has a learn road ID assigned thereto, and the learn road ID and shape point coordinates information, together with additional information including the new road information and the connecting road information are used to generate the road acquisition information. Then, the generated road acquisition information is added to the new road table. The new road learned by the database is designated as a "learning road," a "new road", or an "acquired road" in the following description, depending on the description context.

(2) New Road Table

Figures 3A, 3B:
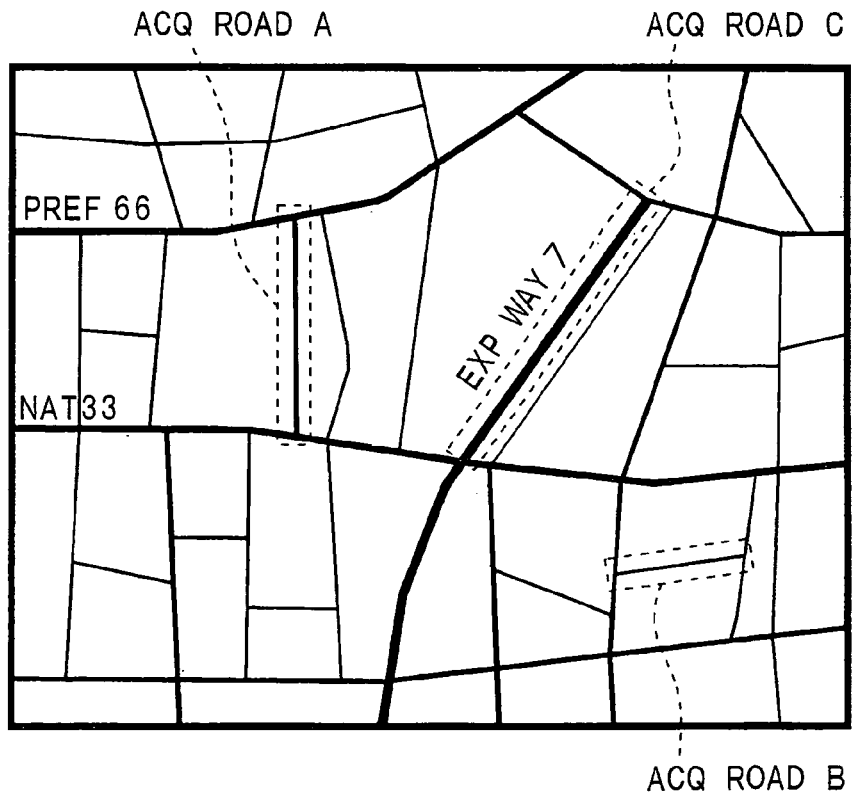
FIGS. 3A and 3B are a data table and a map regarding the road acquisition process in the embodiment.

The new road table that identifies the new road is described in this section. The new road table is memorized in the memory unit 14. The new road table is composed of one or more pieces of the road acquisition information, and each of the road acquisition information identifies only one new road. As shown in FIG. 3A, the new road table takes a list form, and each of the records in the list is the road acquisition information.

In FIG. 3B, an illustrative map for showing a nearby place in the vicinity of the new road identified by the new road table is presented. In this case, the nearby place map is used for explaining the new road identified by the new road table. The new road in this map is not yet registered as a road section in the database that is accessed by the navigation apparatus 10. Thus, please note that this map is different from the map that is drawn by the database.

The new road table has items of "learn road ID," "shape point coordinates information," "additional information," and the "additional information" has a sub-item "connecting road information," and "new road information."

The "learn road ID" is the ID to identify a new road (i.e., a "learning/acquired" road depending on a context). In the table of FIG. 3A, the IDs of A, B, and C are assigned respectively to the three entries of the road acquisition information as the learn road ID.

Further, the "shape point coordinates information" is the item which shows shape point coordinates of the learning road. In the table of FIG. 3A, the "shape point coordinates information" of the road acquisition information having the "learn road ID" of A represents shape point coordinates of "A1(xa1, ya1), A2(xa2, ya2), and A3(xa3,ya3)." Further, the "shape point coordinates information" of the road acquisition information having the "learn road ID" of B represents shape point coordinates of "B1(xb1, yb1), B2(xb2, yb2), and B3(xb3, yb3)." Further, the "shape point coordinates information" of the road acquisition information having the "learn road ID" of C represents shape point coordinates of "C1(xc1, yc1), and C2(xc2, yc2)."

Further, the "connecting road information" in the "additional information" is the item which represents the name/attribute and the like of the connecting road of the learning road. In the table of FIG. 3A, the "connecting road information" of the road acquisition information having the "learn road ID" of A represents the name of the connecting road "National road 33, Prefectural road 66." Further, the "connecting road information" of the road acquisition information having the "learn road ID" of B represents the attribute of the connecting road "One-way traffic, and Two lanes in each traffic." Further, the "connecting road information" of the road acquisition information having the "learn road ID" of C represents the void data.

In addition, the "new road information" in the "additional information" is the item which represents the name and the attribute of the learning road and the like. In the table of FIG. 3A, the "new road information" of the road acquisition information having the "learn road ID" of A shows the attribute of the learning road "the single-lane on one side of traffic." Further, the "new road information" of the road acquisition information having the "learn road ID" of B represents the void data. Further, the "new road information" of the road acquisition information having the "learn road ID" of C represents the name of the new road "Expressway 7."

Further, the learning road which is identified by the road acquisition information having the "learn road ID" of A in the new road table of FIG. 3A corresponds to an acquired road A in the map of FIG. 3B, and the learned road identified by the road acquisition information having the ID of B corresponds to an acquired road B in the map of FIG. 3B, and the learned road having the ID of C corresponds to an acquired road C in the map of FIG. 3B.

(3) Table Update Process

Figure 4:
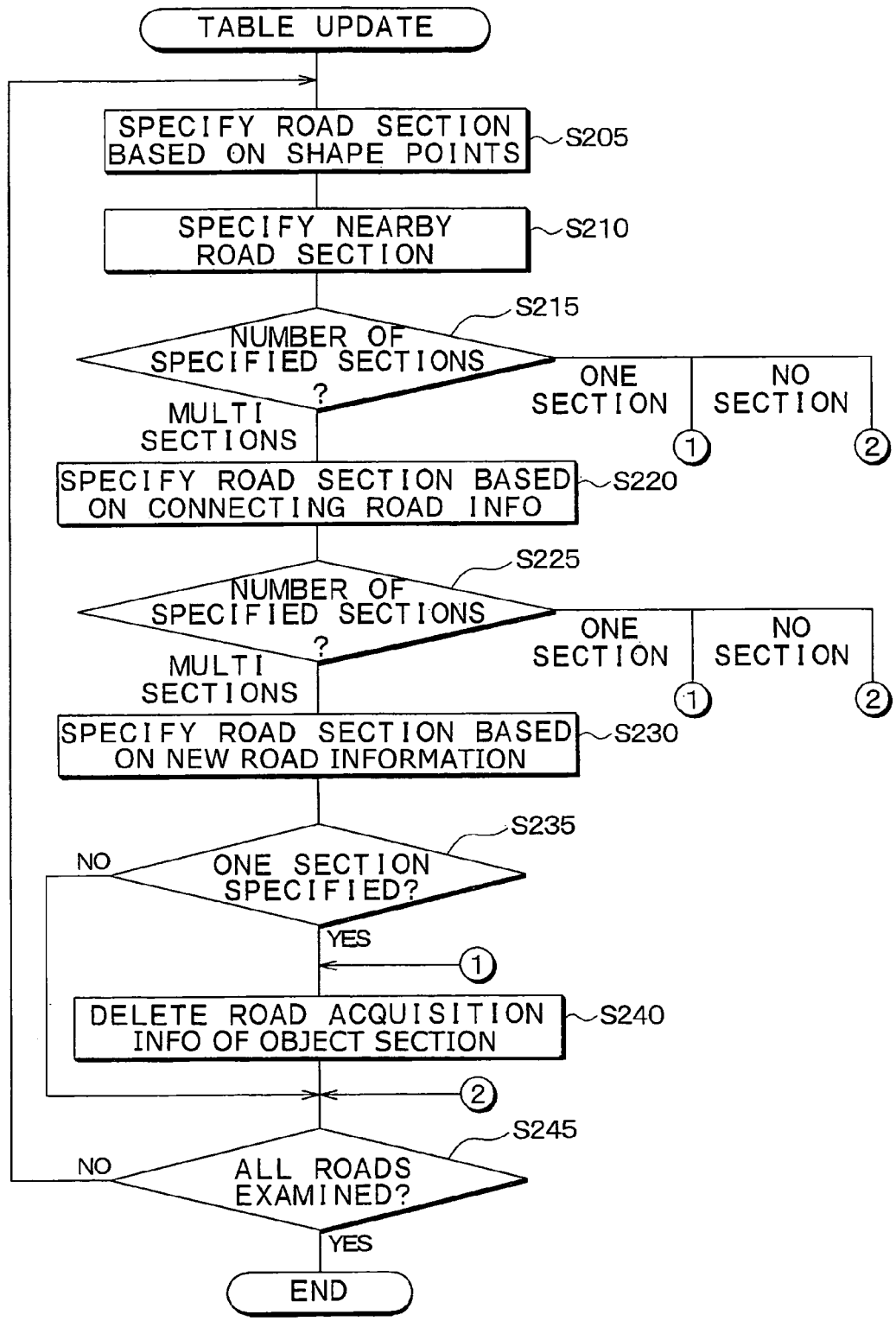
FIG. 4 is a flowchart of a table update process in the embodiment.

When the map database which is accessed by the navigation apparatus 10 is updated, it is possible that the road section corresponding to the "new road (learning road)" described above is already registered in the updated map database. In case that the map database is updated and a part of the learned road is included in the update of the map database, a part of the road acquisition information for identifying the road section corresponding to the registered road section included in the updated map database has to be invalidated. The table update process deletes that useless part of the road acquisition information from the new road table. The table update process is explained with reference to a flowchart in FIG. 4. The update process is started when the map database accessed by the navigation apparatus 10 is updated.

In S205, the control unit 16 of the navigation apparatus 10 specifies the learning road of which a determination of whether the updated map database includes the corresponding road section registered therein has not yet been performed. Then, the control unit 16 specifies a road section in the updated map database, by utilizing the "shape point coordinates information" in the road acquisition information of the above-specified learning road of which the determination of database registration has not yet performed. That is, in other words, whether the learning road exists in the updated map database is determined, and is specified if existing. Then, in S210, the control unit 16 specifies a road section existing within a range of 30 meters, for example, from the specified road section in the database. In this case, the control unit 16 may simply specify the road section by using only the "shape point coordinates information," or may specify the road section by additionally using the "shape point coordinates information" in addition to (i.e., for supplementing) the above-specified road section.

Then, according to the number of the road sections specified in S210, the process is branched in S215. When more than one road section is specified, the process proceeds to S220, and when one road section is specified, the process proceeds to S240, and when no road section is specified, the process proceeds to S245.

In S220, the control unit 16 specifies the road section which agrees with the contents of the "connecting road information" in the road acquisition information corresponding to the learning road to be determined from among the road sections specified in S210, based on the updated map database. More specifically, for example, if the "connecting road information" shows the name of the connecting road, the road section which is connected to the road section having that name is specified from among the road sections specified in S210. If the "connecting road information" shows the attribute of the connecting road, and the connecting road having the agreeing attribute is specified from among the road sections specified in S210. If the "connecting road information" has the void data, the control unit 16 does not specifies the road section based on the agreement of the contents of the "connecting road information," and uses the road sections specified in S210 as the road section specified in the present step.

Then, according to the number of the road sections specified in S220, the process is branched again in S225. When more than one road section is specified, the process proceeds to S230, and when one road section is specified, the process proceeds to S240, and when no road section is specified, the process proceeds to S245.

In S230, the control unit 16 specifies the road section which agrees with the contents of the "new road information" in the road acquisition information corresponding to the learning road (i.e., the new road) to be determined from among the road sections specified in S220, based on the updated map database. More specifically, for example, if the "new road information" shows the name of the learning road, the road section having that name is specified from among the road sections specified in S220. If the "new road information" shows the attribute of the learning road, and the learning road having the agreeing attribute is specified from among the road sections specified in S220. If the "new road information" has the void data, the control unit 16 does not specifies the road section based on the agreement of the contents of the "new road information," and uses the road sections specified in S220 as the road section specified in the present step. Then, the process proceeds to S245.

In S235, the control unit 16 determines whether one road section is specified corresponding to the learning road of the determination object in S230. Then, the process proceeds to S240 if one road section is specified (S235: Yes), or the process proceeds to S245 if one road section is not specified (S235: No).

In S240, the control unit 16 deletes a part of the road acquisition information corresponding to the learning road of the determination object from the new road table. In this case, the control unit 16 may use a flag that shows the invalidated condition of the road acquisition information, for the purpose of invalidation of the part of the road acquisition information.

Then, the control unit 16 determines whether or not all of the learning roads are determined in terms of registration in the updated map database in S245. That is, whether all of the learning roads have a corresponding road section in the updated map database is determined. If all roads have been examined (S245: Yes), the control unit 16 finishes the process. If there are learning roads to be determined (S245: No), the process returns to S205.

(4) Road Section Information

The navigation apparatus 10 acquires, through the external communication unit 19, the traffic information from the information center (e.g., VICS information center) by, for example, the FM multiplexed broadcast. The traffic information includes accident information, congestion information and the like. The traffic information also includes road section information for specifying a road section that is registered in the map database accessed by the data input unit 15. The navigation apparatus 10 uses this road section information to identify the road section having an accident, congestion or the like, and notifies the user of the identified road section. The road section information acquired from the information center is explained in more detail in the following description.

Figures 5A, 5B:
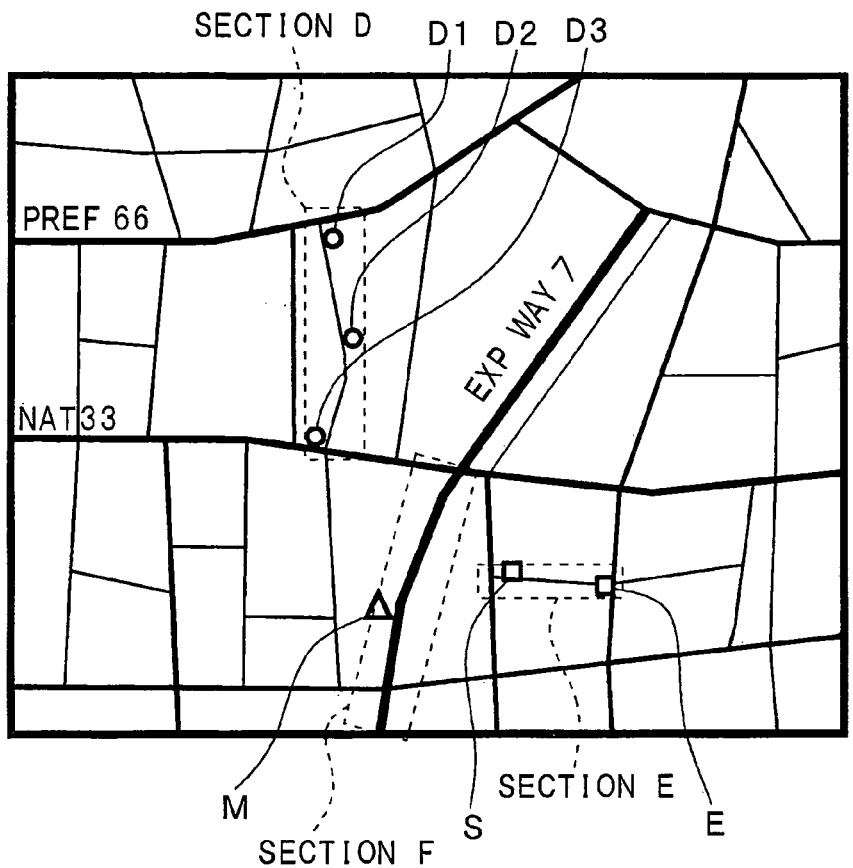
FIGS. 5A and 5B are a map and a data table regarding a road section identification process in the embodiment.

FIG. 5A shows a nearby map including surroundings of a current position of the subject vehicle. The nearby map is drawn by the navigation apparatus 10 which has access to the map database. FIG. 5B shows a road section information list which is composed of multiple entries (i.e. records) of the road section information, each of which specifies a road section in the nearby map. That is, in other words, each record of information in the list corresponds to one road section.

The items of the road section information list include an "ID," a "coordinates information," and an "additional information." The "additional information" item includes subitems of a "connecting road information," and a "section data."

The item "ID" shows an ID to identify the road section information. In the list of FIG. 5B, the IDs of "D," "E," and "F" are assigned to the information records.

The item "coordinates information" shows the coordinates of a point on the road section, or the coordinates of a point in the vicinity of the road section, which is identified by each record of the road section information.

In the road section information list in FIG. 5B, the "coordinates information" of the road section information having the ID of "D" represents coordinates "D1(xd1, yd1), D2(xd2, yd2), and D3(xd3, yd3)." These coordinates are the shape point coordinates of the road section specified by the relevant road section information in the map database stored in the information center (e.g., in the VICS information center).

The "coordinates information" of the road section information having the ID of "E" shows coordinates "S(xs, ys), and E(xe, ye)." These coordinates are coordinates of a start point and an end point of the road section specified by the relevant road section information in the map database stored in the information center (e.g., in the VICS information center).

The "coordinates information" of the road section information having the ID of "F" shows coordinates "M(xm, ym)." These are the coordinates of a middle point of the road section specified by the relevant road section information in the map database stored in the information center (e.g., in the VICS information center).

As described above, the "coordinates information" of the road section information in the list represents coordinates of shape points of the road section as well as a start/end point and a middle point of the road section. The "coordinates information" may also represents coordinates of a nearby point of those points, that is, a nearby points of shape points, a start/end point, and a middle point of the road section. The "coordinates information" may also represents coordinates of a point on the road section, or a point in a vicinity of the road section, which is irrelevant to the shape points of the road section.

The "connecting road information" is the item which shows the name, the attribute and other data of the road which is connected to the road section specified by the road section information.

In the list of FIG. 5B, the "connecting road information" of the road section information having the ID of "D" represents "National road 33, and Prefectural road 66" that are connected to the relevant road section specified by the road section information.

Further, the "connecting road information" of the road section information having the ID of "E" represents the attributes "One lane in traffic on one side, and Two lanes traffic on one side" of the respective connecting roads that are connected to the relevant road section specified by the road section information.

Further, the "connecting road information" of the road section information having the ID of "F" is filled with the void data. In this case, if the connecting road in the map database of the information center (e.g., the VICS information center) does not have the name and attribute registered therein due to the road rank categorized as a minor road or the like, the name and attribute of the connecting road information are filled with void data.

The "section data" is the item which shows the name, the attribute and/or other data of the road section which is specified by each record of the road section information.

In the road section information list in FIG. 5A, the "section data" of the road section information having the ID of "D" shows the attribute of the road section denoted as "One way road."

The "section data" of the road section information having the ID of "E" shows void data. In this case, if the road section in the map database of the information center (e.g., the VICS information center) does not have the name and attribute registered therein due to the road rank categorized as a minor road or the like, the section data is filled with void data.

The "section data" of the road section information having the ID of "F" shows the name of the road section denoted as "Expressway 7."

The road section which is specified by the road section information in the above road section information list is described in more detail in the following.

The road section information in the road section information list having the ID of "D" shows the road section D in the nearby map of the present location in FIG. 5A. In the map, nearby points D1 to D3 are shown as nearby points of the road section D. These nearby points D1 to D3 are respectively represented by the coordinates "D1(xd1, yd1), D2(xd2, yd2), D3(xd3, yd3)" in the "coordinates information" of the relevant road section information.

The road section information in the road section information list having the ID of "E" shows the road section E in the nearby map of the present location in FIG. 5A. In the map, nearby points S and E are shown as nearby points of the road section E. These nearby points S and E are respectively represented by the coordinates "S(xs, ys), E(xe, ye)" in the "coordinates information" of the relevant road section information.

The road section information in the road section information list having the ID of "F" shows the road section F in the nearby map of the present location in FIG. 5A. In the map, a nearby point M is shown as a nearby point of the road section F. The nearby point M is represented by the coordinates "M(xm, ym)" in the "coordinates information" of the relevant road section information.

The "coordinates information" in each record of the road section information shows the shape point coordinates of the specified road section, as well as coordinates of other points such as the start/end point, the middle point and the like, based on the map database in the information center (e.g., in the VICS information center). Therefore, please not that the coordinates represented by the "coordinates information" do not necessarily match (i.e., are different from) the coordinates of the road section that is specified by the map database accessible by the navigation apparatus 10.

(5) Road Section Identification Process

Figure 6:
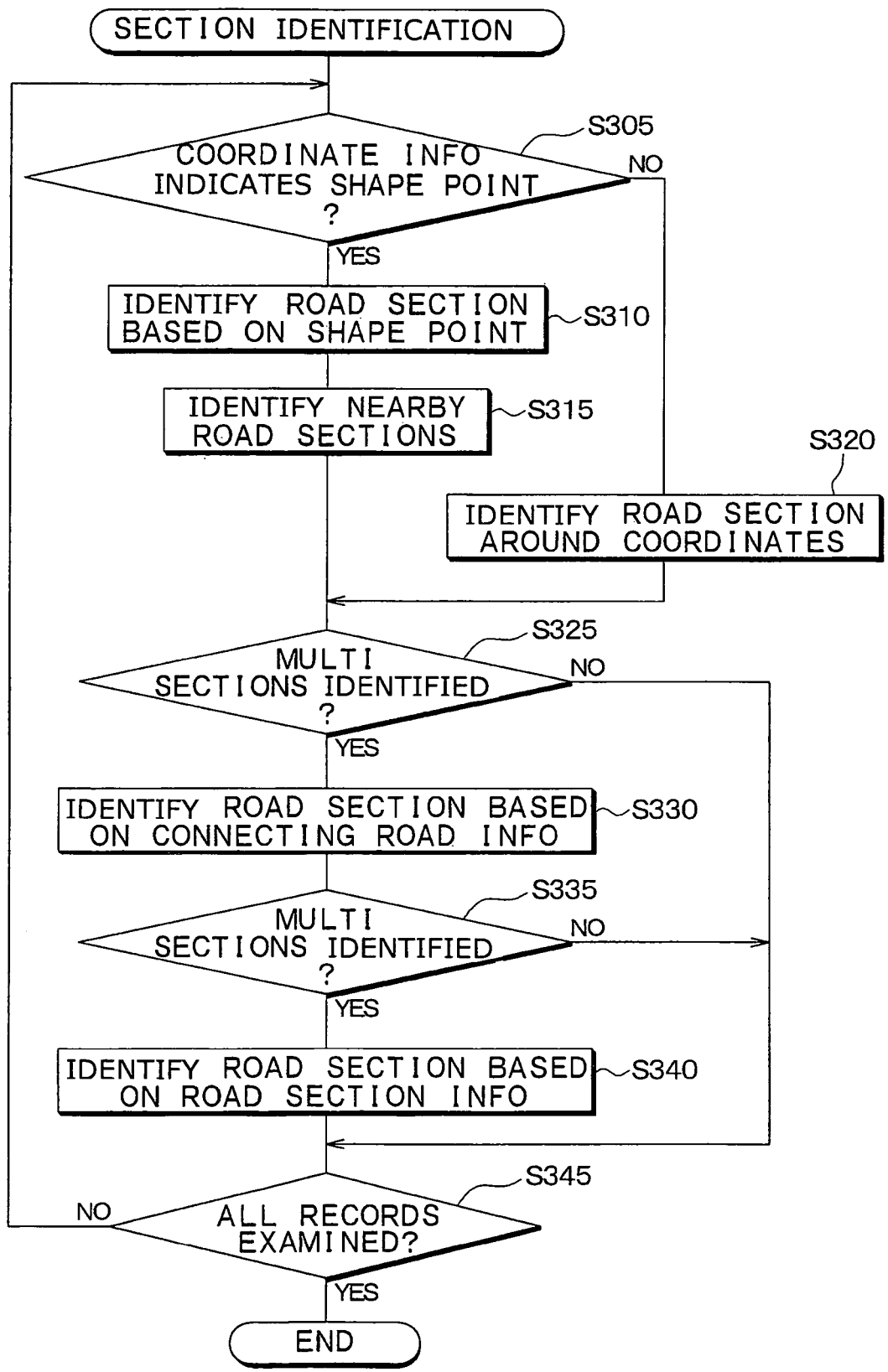
FIG. 6 is a flowchart of the road section identification process in the embodiment.

The road section identification process is a process that determines identity of a road section specified in the section data included in the traffic information from the information center (e.g., in the VICS information center) or other information resources. The road section identification process is explained by a flowchart in FIG. 6. The road section identification process is started when the traffic information is acquired from the information center (e.g., the VICS information center) or other resources through the external communication unit 19 by the navigation apparatus 10.

In S305, the control unit 16 of the navigation apparatus 10 identifies, from among all records of road section information acquired from the information center, road section information of which corresponding road section has not yet been determined. The identified road section information is designated as object road section information in the following description, because the information is considered as a "determination object" in the following steps of the road section identification process. Then, it is determined whether or not the "coordinates information" in the object road section information indicates the shape point coordinates of the road section that is specified by the road section information. If the "coordinate information" indicates the shape point coordinate (S305: Yes), the process proceeds to S310, or if the "coordinate information" does not indicate the shape point coordinates (S305: No), the process proceeds to S320.

In S310, the control unit 16 identifies, in the map that is drawn based on the map database accessed through the data input unit 15, one or more road sections indicated by the "coordinates information" in the object road section information. Then, in S315, one or more nearby road sections existing within a range of, for example, 30 meters from the above-identified road section(s) are identified from among the registered road sections in the map database. The process then proceeds to S325.

In S320 that follows a branch condition that the "coordinates information" is not the shape point coordinates of the road section, the control unit 16 identifies one or more road sections existing within a range of, for example, 30 meters from each point indicated by the "coordinates information" in the object road section information, and the process proceeds to S325. In this case, when the "coordinates information" indicates coordinates of the start and end points of a road section, the identified road section may be a road section with its start and end points respectively located around those start and end points. Further, when the "coordinates information" indicates coordinates of the middle point of a road section, the identified road section may be a road section having its middle point existing around the middle point of that road section.

In S325, the control unit 16 determines whether multiple road sections have been identified in S315 or S320. When multiple road sections have been identified, the process proceeds to S330. When only one road section has been identified, the process proceeds to S345, with a determination that the identified one road section is the section indicated by the object road section information. If no road section has been identified, the process proceeds to S345, with a determination that a road section indicated by the object road section information is not registered in the map database.

In S330, the control unit 16 identifies, from among the identified road sections in S315 or S320, the road sections matching with the contents of the "connecting road information" in the object road section information based on the map database. More practically, when the "connecting road information" is the name of the connecting road, the road sections connected to the road section having that name are identified from among the road sections identified in S315 or the like. Further, when the "connecting road information" is the attribute of the connecting road, the road sections connected to the road section having that attribute are identified from among the road sections identified in S315 or the like. When the "connecting road information" is filled with the void data, the road section identification based on the "connecting road information" is not performed by the control unit 16, and the road section(s) identified in S315 or the like is considered as the road section identified in this step of S330. Then, the process proceeds to S335.

In S335, it is determined by the control unit 16 whether or not multiple road sections are identified in S330. When multiple road sections have been identified, the process proceeds to S340. When only one road section has been identified, the process proceeds to S345, with a determination that the identified one road section is the section indicated by the object road section information. If no road section has been identified, the process proceeds to S345, with a determination that a road section indicated by the object road section information is not registered in the map database.

In S340, the control unit 16 identifies, from among the identified road sections in S330, the road section matching with the contents of the "section data" in the object road section information based on the map database. More practically, when the "section data" is the name of the road section, the road section having that name is identified from among the road sections identified in S330. Or, when the "section data" is the attribute of the road section, the road section having that attribute is identified from among the road sections identified in S330. Or, when the "section data" is filled with the void data, the road section identification based on the "section data" is not performed by the control unit 16, and the road section(s) identified in S330 is considered as the road section identified in this step of S340. Then, if only one road section is identified, the control unit 16 determines that the identified road section is the one indicated by the road section information. If multiple road sections are identified, or if no road section is identified, the control unit 16 determines that the road section indicated by the object road section information is not registered in the map database. Then, the process proceeds to S345.

In S345, the control unit 16 determines whether or not all records of the road section information have been examined in terms of road section identification. When all records have been examined (S345: Yes), the control unit 16 end this process. If not all records have been examined (S345: No), the control unit 16 controls the process to return to S305.

ADVANTAGEOUS EFFECTS

The advantageous effects of the present embodiment are summarized in the following, with a focus of how a road section in the updated map database is identified. That is, when the navigation apparatus 10 of the present embodiment uses the shape points information as well as information on name and attribute for accurately identifying a newly acquired road in a road acquisition process, those information can also be used as a clue to determine whether or not the newly acquired road is registered as a road section in the updated map database, by substantially following the same steps of the road acquisition process illustrated in FIG. 2, which illustrates a road acquisition process performed by the navigation apparatus 10 for acquiring a new road. In other words, without using database specific IDs such as link IDs of connecting roads, the navigation apparatus 10 can identify the newly acquired road as a road section in the updated database. As a result, information of the newly acquired road corresponding to the road section registered in the updated map database can be accurately identified and invalidated, even when the identified road section has a different ID assigned thereto after the update of the map database, which is often the case in these days. Further, the accuracy of the road section identification is secured when information of a road section is acquired through, for example, a radio broadcasting of traffic information or the like from the traffic information center (e.g., from the VICS information center), which identifies a road section based on the shape points and start/end points of the road section as well as the name and attribute of the target road or connecting roads, by taking substantially same steps of the road section identification process illustrated in FIG. 6, which updates a data table for acquiring a new road.

Other Embodiments

Although the present disclosure has been fully described in connection with preferred embodiment thereof with reference to the accompanying drawings, it is to be noted that various changes and modifications will become apparent to those skilled in the art. For example:

(1) The navigation apparatus 10 of the present embodiment identifies a new road based on the name and attribute of connecting roads of the new road in the road acquisition process, and examines if the identified new road is registered in the updated map database based on the name/attribute of the connecting roads. However, instead of using connecting road information, the navigation apparatus 10 may generate and employ other clues including facility information such as information on a commercial facility, an amusement facility or the like in the vicinity of the new road, and may examine if the new road is registered in the updated database based on the facility information.

Further, the traffic information from the information center (e.g., the VICS information center) may include the facility information, instead of the connecting road information, in the road section information, and the navigation apparatus 10 may identify a road section based on the facility information in the road section information.

Even when the connecting road information is replaced with the facility information, the same advantageous effects of the above embodiment are achieved.

(2) The above embodiment describes an application of the present invention to the navigation apparatus 10. However, the present invention may be applicable to other mobile/portable devices such as a cellular phone or the like having a navigation capability based on an access to a map database. That is, when the mobile device is equipped with the navigation function that accesses the map database in an information server at a remote place, with the same problem arising therefrom, the same advantageous solution in the above embodiment can be utilized, providing the same advantages to its user.

(Correspondence of Terms in the Embodiments and in Claims)

Correspondence of terms used in the embodiments and in claims is exemplified in the following.

The navigation apparatus 10 corresponds to a data processing apparatus. The control unit 16 corresponds to a section information generation unit, a road section identification unit, and an invalidation unit. The data input unit 15 corresponds to a database access unit. The external communication unit 19 corresponds to a road section information acquisition unit. Further, a new road corresponds to a road section that is not yet registered, and the road acquisition information corresponds to not-yet-registered road section information, and the road section information corresponds to registered road section information.

Further, the link ID in the map database which is accessed through the data input unit 15 corresponds to a map database specific ID used in the map database accessed by the database access unit. Such changes, modifications, and summarized scheme are to be understood as being within the scope of the present disclosure as defined by appended claims.

What is claimed is:

1. A data processing apparatus for processing information of a road, the apparatus comprising:
   a database access unit for enabling access to a map database having pre-registered information of the road;
   a section information generation unit for generating not-yet-registered road section information identifying a new road section that is not yet registered in the map database, the not-yet-registered road section information of the new road section being saved in a new road table in a memory unit, the not-yet-registered road section information includes (a) coordinate information that represents road shape coordinates of the new road section and (b) additional information that represents, without using a map database specific ID used in the map database accessible by the database access unit, (b-1) the new road section or (b-2) a nearby terrestrial object in a vicinity of the new road section;
   a road section identification unit for revising the new road table when the map database accessed by the database access unit has been updated from a resource external to the data processing apparatus by determining whether the new road section saved in the new road table is one of road sections registered in the map database that was updated; and an invalidation unit for invalidating the new road section and the corresponding not-yet-registered road section information for the new road section responsive to the road section identification unit determining that the new road section is one of the road sections registered in the map database by the road section identification unit, wherein the road section identification unit pre-identifies, based on the coordinate information in the not-yet-registered road section information, a pre-identified road section in a vicinity of the new road section that is identified by the coordinate information from among the road sections registered in the updated map database, and the pre-identified road section is further identified by the road section identification unit in terms of matching to the additional information in the not-yet-registered road section information.

2. The data processing apparatus unit of claim 1, wherein the new road table can list plural roads, and each record in the list is the not-yet-registered road section information for each of the plural roads.

3. The data processing apparatus unit of claim 1, wherein the new road table includes, for each of plural roads listed in the new road table, at least coordinate information, and connecting road information from the map database.

4. The data processing apparatus unit of claim 1, wherein the additional information in the road section information is (a) road name information of a road that is connected to the new road section identified by the road section information or (b) road name information of a road that is connected to the new road section represented by the road section information.

5. The data processing apparatus unit of claim 1, wherein the additional information in the road section information is (a) road attribute information of a road that is connected to the nee road section identified by the road section information or (b) road attribute information of a road that is connected to the road section represented by the new road section information.

6. The data processing apparatus unit of claim 1, wherein the additional information in the road section information is (a) road name information of a road that includes the new road section identified by the road section information or (b) road name information of a road that includes the new road section represented by the road section information.

7. The data processing apparatus unit of claim 1, wherein the additional information in the road section information is (a) road attribute information of the new road section identified by the road section information or (b) road attribute information of the new road section represented by the road section information.

8. The data processing apparatus unit of claim 1, wherein the road section identification unit that revises the new road table and the invalidation unit that can invalidate the new road section are triggered, when the map database which is accessed by the database access unit is updated.

9. The data processing apparatus of claim 1, wherein the map database that registers information of the road is external to the vehicle; and the database access unit is configured to access the map database in an external storage facility that exists outside of the vehicle.

10. The data processing apparatus of claim 9, wherein the data processing apparatus is configured for use in a vehicle.

11. The data processing apparatus of claim 9, wherein the data processing apparatus is configured for use in a mobile device.

12. The data processing apparatus of claim 1, wherein the map database that registers information of the road is external to the vehicle; and the database access unit is configured to access, via a wireless communication, the map database stored in an external server.

13. The data processing apparatus of claim 12, wherein the data processing apparatus is configured for use in a vehicle.

14. The data processing apparatus of claim 12, wherein the data processing apparatus is configured for use in a mobile device.

* * * * *